United States Patent
Tanabe et al.

(10) Patent No.: US 9,845,877 B2
(45) Date of Patent: Dec. 19, 2017

(54) METHOD OF PRODUCING GASKET AND GASKET

(71) Applicant: Nippon Pillar Packing Co., Ltd., Osaka-shi, Osaka (JP)

(72) Inventors: Hiroki Tanabe, Osaka (JP); Yuji Yanagitake, Osaka (JP); Yuta Sato, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 0 days.

(21) Appl. No.: 14/808,491

(22) Filed: Jul. 24, 2015

(65) Prior Publication Data
US 2016/0025225 A1 Jan. 28, 2016

(30) Foreign Application Priority Data

Jul. 25, 2014 (JP) ................................ 2014-151778
Jul. 25, 2014 (JP) ................................ 2014-151779

(51) Int. Cl.
*F16J 15/10* (2006.01)
*F16J 15/12* (2006.01)
(Continued)

(52) U.S. Cl.
CPC ............ *F16J 15/102* (2013.01); *B32B 37/10* (2013.01); *B32B 37/144* (2013.01); *B32B 37/16* (2013.01);
(Continued)

(58) Field of Classification Search
CPC F16J 15/12; F16J 15/102; F16J 15/104; F16J 15/121; F16J 15/126; B32B 37/10;
(Continued)

(56) References Cited

U.S. PATENT DOCUMENTS 1,636,363 A * 7/1927 Hettinger ............... F16J 15/121
277/633
1,782,014 A * 11/1930 Rimmelspacher ..... F16J 15/121
277/653
(Continued)

FOREIGN PATENT DOCUMENTS

EP 0 945 634 A1 9/1999
EP 1 473 493 A2 11/2004
(Continued)

OTHER PUBLICATIONS

European Search Report dated Jan. 18, 2016.

*Primary Examiner* — Eugene G Byrd
(74) *Attorney, Agent, or Firm* — Rankin, Hill & Clark, LLP

(57) ABSTRACT

A method of producing a gasket in which burrs can be prevented from being formed, and a mold failure can be suppressed, and a gasket are provided. A method of producing a gasket includes: a step S1 of preparing a metal mesh member and expanded graphite; a step S2 of placing the metal mesh member around the expanded graphite in a manner that a long belt-like composite body in which the expanded graphite is enveloped by the metal mesh member is formed; a step S4 of adjusting the shapes of longitudinal end portions of the composite body in a manner that, in the short-side direction of the composite body, the width dimensions of the longitudinal end portions of the composite body are smaller than the width dimension of a longitudinal middle portion of the composite body; a step S5 of spirally winding the composite body in a manner that a tubular body in a multiply wound state in which an axial direction coincides with the short-side direction of the composite body is formed; and a step S6 of compress molding the tubular body in the axial direction of the tubular body.

2 Claims, 14 Drawing Sheets

(51) Int. Cl.
*B32B 37/10* (2006.01)
*B32B 37/14* (2006.01)
*B32B 37/16* (2006.01)

(52) U.S. Cl.
CPC .......... *F16J 15/104* (2013.01); *F16J 15/108* (2013.01); *F16J 15/121* (2013.01); *F16J 15/126* (2013.01); *B32B 2305/38* (2013.01); *B32B 2313/04* (2013.01); *B32B 2581/00* (2013.01)

(58) Field of Classification Search
CPC ... B32B 37/144; B32B 37/16; B32B 2305/38; B32B 2313/04
See application file for complete search history.

(56) References Cited

U.S. PATENT DOCUMENTS

| | | | | |
|---|---|---|---|---|
| 2,194,943 | A * | 3/1940 | Hubbard | F16J 15/12 277/627 |
| 3,230,290 | A * | 1/1966 | Nelson | B29D 99/0053 156/228 |
| 4,201,804 | A * | 5/1980 | Stecher | F16J 15/102 277/591 |
| 4,516,782 | A * | 5/1985 | Usher | F01N 13/1827 264/258 |
| 4,902,024 | A * | 2/1990 | Takenoshita | F01N 13/1827 156/192 |
| 5,040,805 | A * | 8/1991 | Ozora | F01N 13/1811 277/621 |
| 6,663,112 | B1 * | 12/2003 | Sporre | F16J 15/104 277/584 |
| 2004/0217556 | A1 | 11/2004 | Klenk et al. | |
| 2009/0109607 | A1 * | 4/2009 | Rupp | F16J 15/102 361/679.01 |
| 2014/0312618 | A1 | 10/2014 | Shionoya et al. | |

FOREIGN PATENT DOCUMENTS

| | | |
|---|---|---|
| JP | 7-113469 | 5/1995 |
| JP | 2004-076692 | 3/2004 |
| JP | 2013-104550 | 5/2013 |

* cited by examiner

METHOD OF PRODUCING GASKET AND GASKET

TECHNICAL FIELD

The present invention relates to a method of producing a gasket, and a gasket.

BACKGROUND ART

Conventionally, a gasket configured by using a metal mesh member and expanded graphite has been known (for example, see Patent Literature 1). Usually, a method of producing a gasket of this kind includes a material preparing step, a composite body forming step, a tubular body forming step, and the compression molding step.

In the material preparing step, a metal mesh member and expanded graphite are prepared. In the composite body forming step, a long belt-like composite body in which the expanded graphite and the metal mesh member overlap with one another is formed. In the tubular body forming step, the composite body is spirally wound so as to form a tubular body in a multiply wound state in which the axial direction coincides with the short-side direction of the composite body.

In the compression molding step, the tubular body is compression molded in the axial direction in order to obtain a gasket. Specifically, in a state where a stationary die and a movable die which is reciprocable to and from the stationary die are used, the tubular body is loaded between inner and outer stationary dies so that the tubular body is fitted onto the shaft-like inner stationary die. Thereafter, the movable die is pressed in the gap between the inner stationary die and the outer stationary die, the tubular body being located in the gap.

In the above-described method of producing a gasket, when the compression molding step is to be performed, however, the width dimension in the axial direction of the tubular body is substantially constant over the whole circumference (i.e., the width dimension in the short-side direction of the composite body is substantially constant over the whole length). When an external force in the compression direction is applied to the tubular body (composite body), therefore, end portions (free end portions) of the tubular body are excessively deformed, and burrs are easily formed on the gasket which is obtained after the compression molding step.

PRIOR ART LITERATURE

Patent Literature

Patent Literature 1: Japanese Patent Application Laid-Open No. 7-113469

SUMMARY OF THE INVENTION

Problems to be Solved by the Invention

The invention has been conducted in view of the above-discussed circumstances. It is an object of the invention to provide a method of producing a gasket configured by using a metal mesh member and expanded graphite in which burrs can be prevented from being formed, and a mold failure can be suppressed from occurring, and also such a gasket.

Means for Solving the Problems

A first mode of the invention provides
a method of producing a gasket configured by using a metal mesh member and expanded graphite, wherein the method has steps of:
preparing the metal mesh member and the expanded graphite;
placing the metal mesh member around the expanded graphite in a manner that a long belt-like composite body in which the expanded graphite is enveloped by the metal mesh member is formed;
adjusting shapes of longitudinal end portions of the composite body in such a manner that, in a short-side direction of the composite body, width dimensions of the longitudinal end portions of the composite body are smaller than a width dimension of a longitudinal middle portion of the composite body;
spirally winding the composite body in a manner that a tubular body in a multiply wound state in which an axial direction coincides with the short-side direction of the composite body is formed; and
compress molding the tubular body in an axial direction of the tubular body.

According to a second mode of the invention, in the method of producing a gasket of the first mode, the composite body is spirally wound in a manner that the width dimension in a radial direction of the tubular body is substantially constant over a whole circumference of the tubular body.

A third mode of the invention provides a gasket which is produced by the production method of the first mode.

According to a fourth mode of the invention, in the gasket of the third mode,
the gasket includes a first sealing portion placed in one axial end portion of the gasket, and a second sealing portion placed in another axial end portion of the gasket, and has a sectional shape in which the composite body that is in a bent state overlaps in a radial direction, and
the composite body includes a bent portion which is bent in an acute angle shape in a radial direction of the gasket.

According to a fifth mode of the invention, in the gasket of the fourth mode,
the sectional shape is formed by compression molding the composite body in a manner that the first sealing portion has a first sealing surface which is tapered toward one axial end surface, and the second sealing portion has a second sealing surface which is tapered toward another axial end surface.

Effects of the Invention

According to the invention, it is possible to provide a method of producing a gasket configured by using a metal mesh member and expanded graphite in which burrs can be easily prevented from being formed, and a mold failure can be suppressed from occurring, and also such a gasket.

DESCRIPTION OF PREFERRED EMBODIMENTS

Preferred embodiments of the invention will be described with reference to the drawings.

Figure 1:
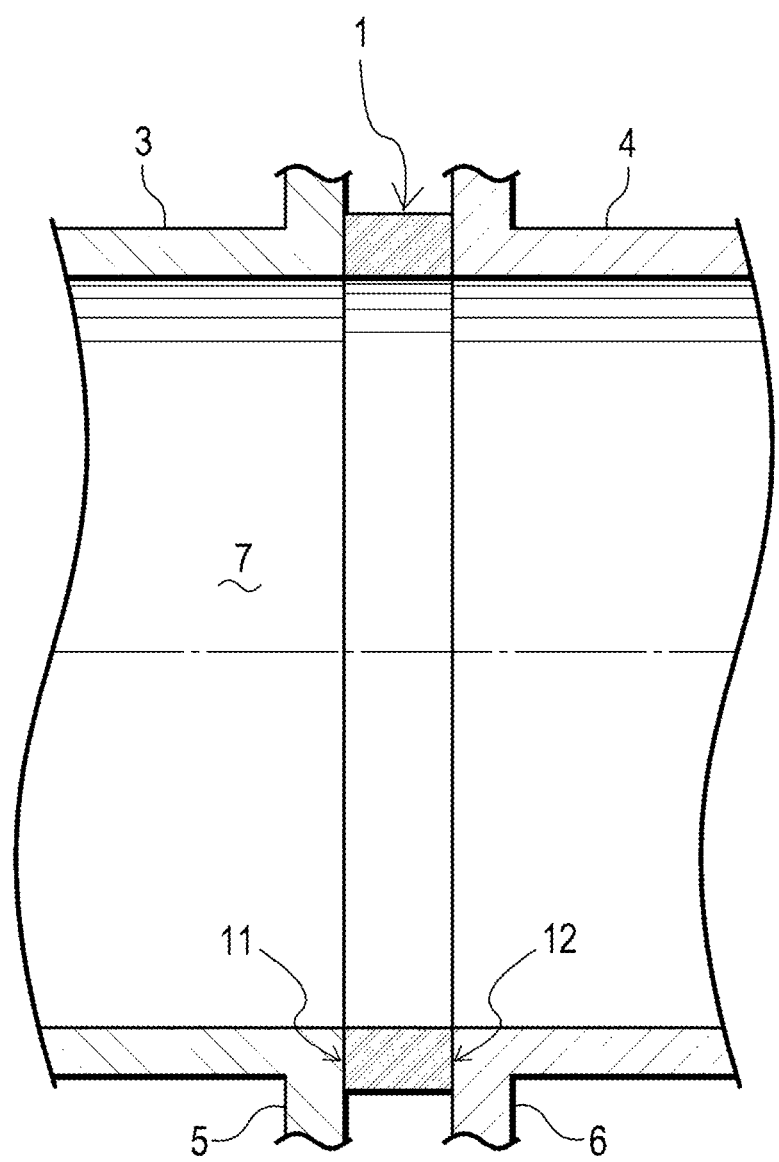
FIG. 1 is a sectional view showing a use state of a gasket which is produced by a method of producing a gasket of an embodiment of the invention.
Figure 2:
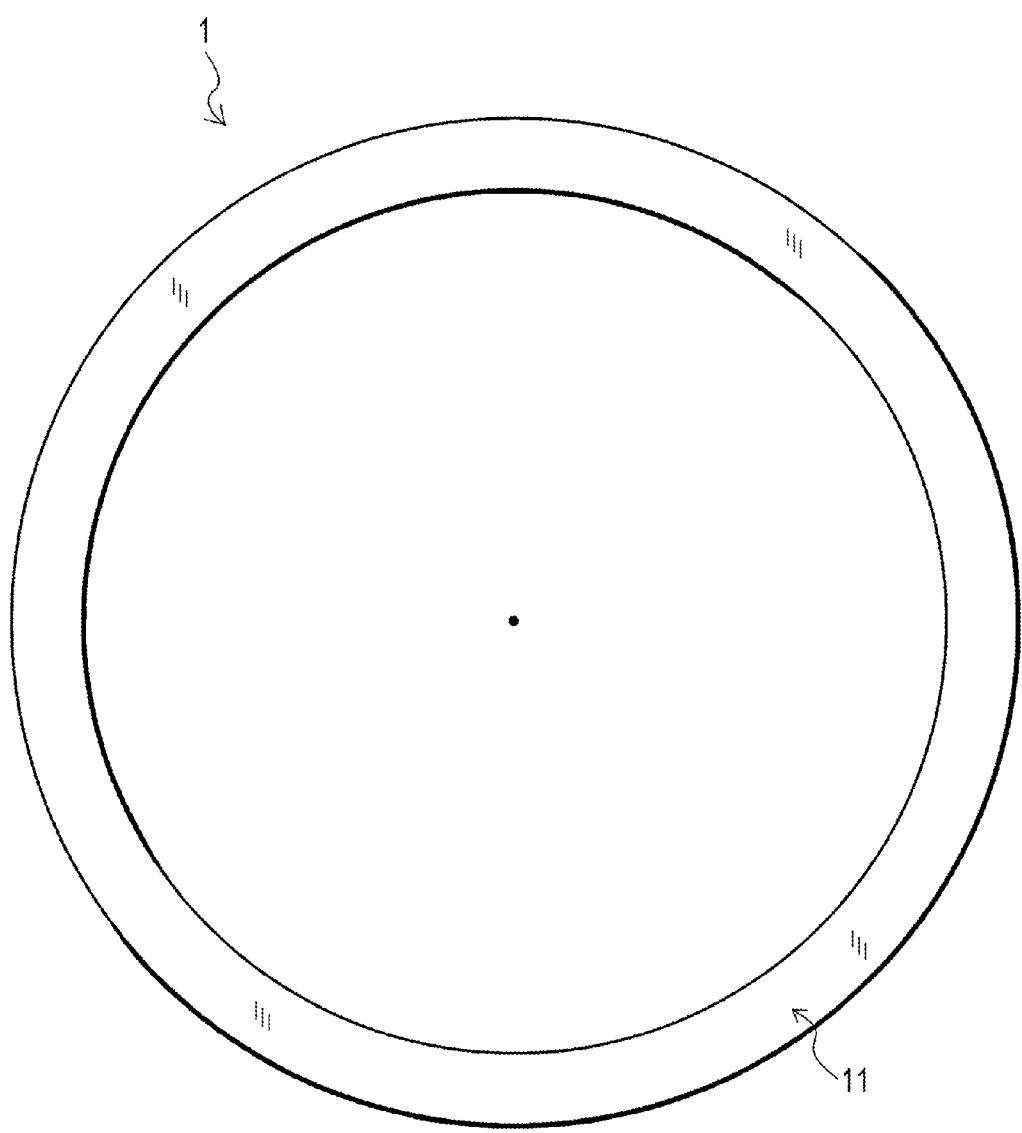
FIG. 2 is a front view of the gasket of FIG. 1.

FIG. 1 shows a use state of a gasket 1 of an example of a gasket which is produced by a method of producing a gasket of an embodiment of the invention, and FIG. 2 is a front view of the gasket 1.

As shown in FIG. 1, for example, the gasket 1 is used in a joint for a first pipe 3 and a second pipe 4. In use in the joint, the gasket 1 is interposed between the first and second pipes 3, 4 in order to seal the gap between opposed end portions of the first and second pipes 3, 4.

As shown in FIGS. 1 and 2, the gasket 1 is formed into an annular shape having a diameter corresponding to the first and second pipes 3, 4, and configured so that, in use of the gasket, the gasket is clamped between a first contact portion 5 which is disposed in an end portion of the first pipe 3, and which is annular, and a second contact portion 6 which is disposed in an end portion of the second pipe 4, and which is annular.

Specifically, the gasket 1 is configured by the method of producing a gasket, and by using a metal mesh member and expanded graphite. The gasket 1 is molded so that metal wires forming the metal mesh member, and expanded graphite mixedly exist in the whole gasket. The method of producing the gasket will be described later.

The gasket 1 includes sealing portions for preventing fluid from leaking from a flow path 7 in the first and second pipes 3, 4 which are connected to each other. In the gasket 1, as shown in FIGS. 1 and 2, a first sealing portion 11 and a second sealing portion 12 are disposed as the sealing portions.

When the gasket 1 is interposed between the first and second contact portions 5, 6, the first sealing portion 11 is pressed against the first contact portion 5 to be press-contacted with the first contact portion 5. In this case, the second sealing portion 12 is pressed against the second contact portion 6 to be press-contacted with the second contact portion 6.

According to the gasket 1, when the gasket 1 is interposed between the first and second pipes 3, 4, a sealing property can be ensured between the first sealing portion 11 and the first pipe 3 (first contact portion 5), and also a sealing property can be ensured between the second sealing portion 12 and the second pipe 4 (second contact portion 6).

Next, the method of producing a gasket of the embodiment which is used for producing the gasket 1 will be described.

Figure 3:
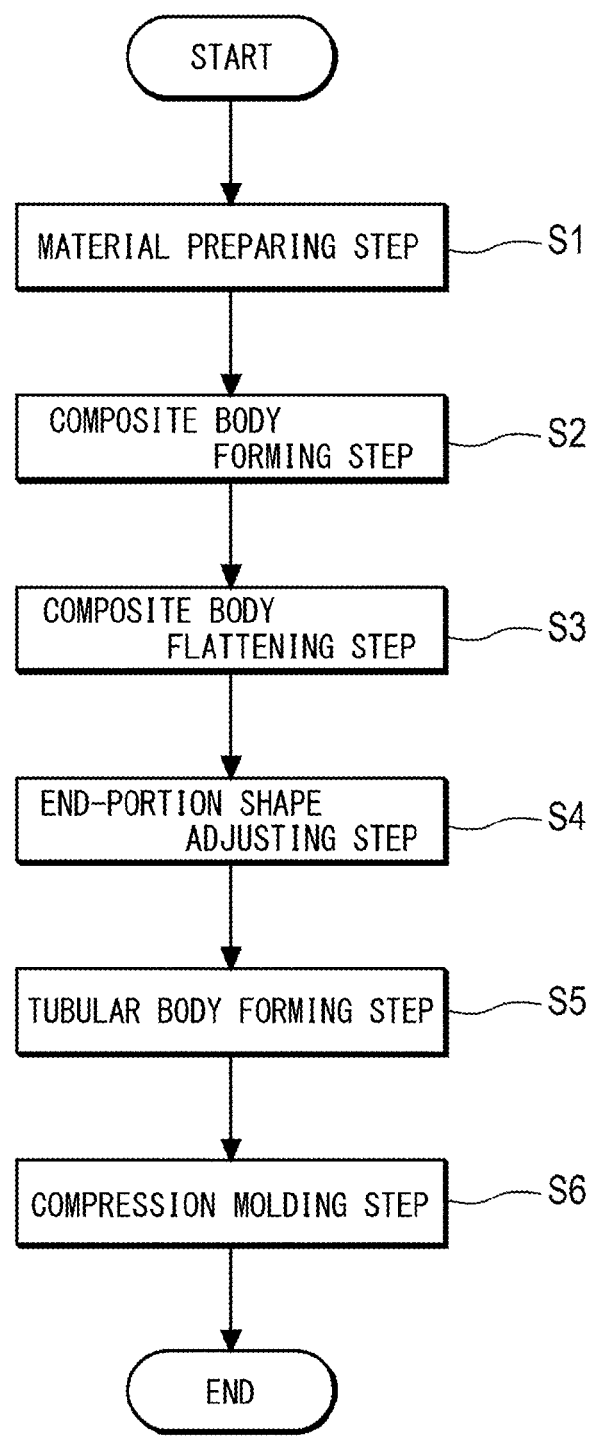
FIG. 3 is a view showing a flow of the method of producing a gasket of the embodiment of the invention.

FIG. 3 shows a flow of the method of producing a gasket. As shown in FIG. 3, the method of producing a gasket includes a material preparing step S1, a composite body forming step S2, an end-portion shape adjusting step S4, a tubular body forming step S5, and a compression molding step S6. In the embodiment, the method of producing a gasket further includes a composite body flattening step S3 which is performed after the composite body forming step S2.

Figure 4A:
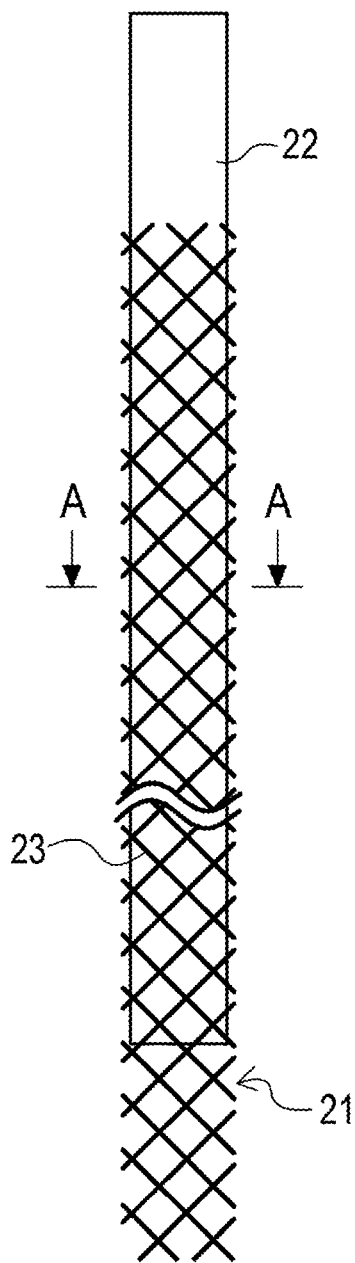
FIG. 4A is a view showing a state of a composite body forming step in the method of producing a gasket of the embodiment of the invention.
Figure 4B:
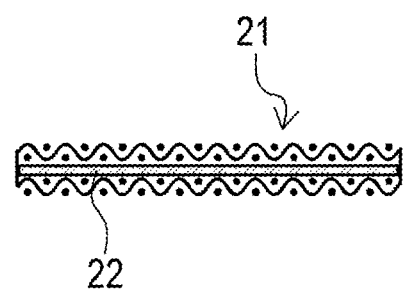
FIG. 4B is a sectional view taken along line A-A in FIG. 4A.

In the material preparing step S1, a metal mesh member 21 and expanded graphite tape 22 which are shown in FIGS. 4A and 4B are prepared. In the embodiment, the metal mesh member 21 is formed by knitting metal wires 23 by a predetermined knitting method such as a loop-forming knitting method, and formed into a laterally elongated tubular shape in which the longitudinal direction coincides with the axial direction (vertical direction).

Metal wires having a predetermined wire diameter (thickness) are employed as the metal wires 23. For example, the metal wires 23 are stainless steel wires having a diameter of about 0.1 to 0.3 mm (preferably, 0.15 mm).

In the longitudinal direction, the expanded graphite tape 22 has a width dimension which is approximately equal to that of the metal mesh member 21. The expanded graphite tape 22 has a predetermined width dimension in the short-side direction, and a predetermined thickness dimension in the thickness direction so as to be insertable into the tubular metal mesh member 21.

In the embodiment, expanded graphite which is formed into a tape-like shape (expanded graphite tape) as shown in FIG. 4 is employed as the expanded graphite which is a material to be prepared in the material preparing step S1. Alternatively, expanded graphite which is cut into a strip-like shape or a linear shape (narrow width) may be employed, or granular expanded graphite may be employed.

Figure 5:
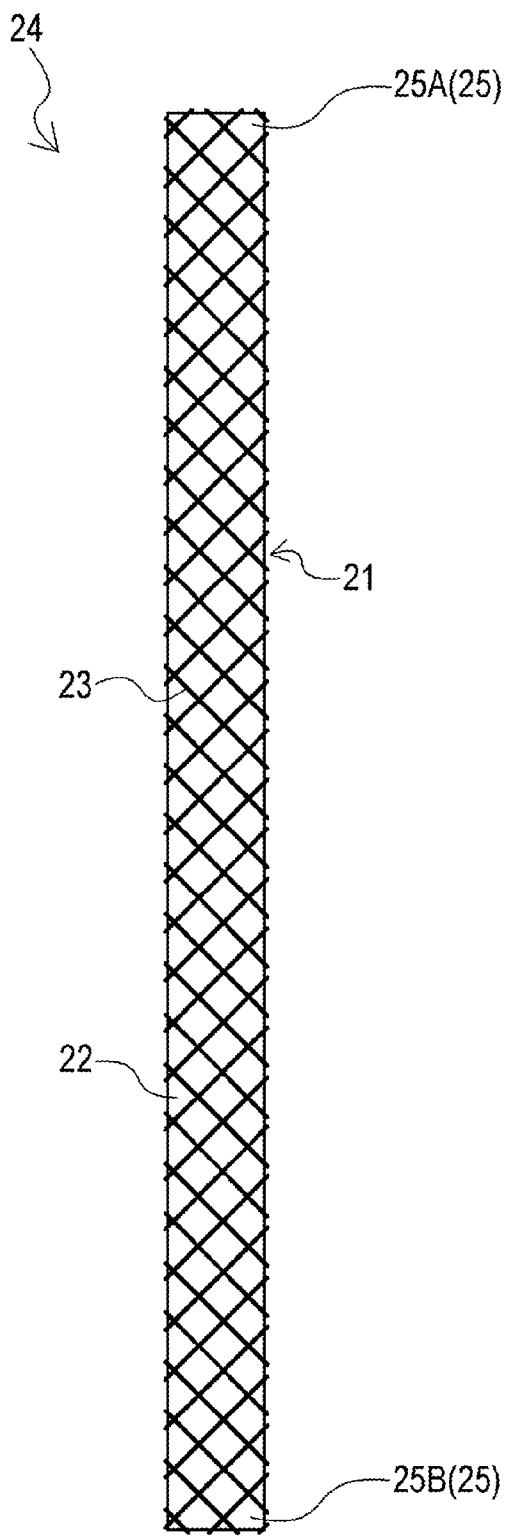
FIG. 5 is a front view of a composite body which is obtained after execution of a composite body flattening step in the method of producing a gasket of the embodiment of the invention.

In the composite body forming step S2, as shown in FIGS. 4A and 4B, the metal mesh member 21 is placed around the expanded graphite tape 22 so as to form the long belt-like composite body 24 (see FIG. 5) in which the expanded graphite tape 22 is enveloped by the metal mesh member 21.

In the embodiment, while the expanded graphite tape 22 is inserted into the tubular metal mesh member 21 over a substantially entire lateral width of the member, the expanded graphite tape is moved along the axial direction of the metal mesh member 21 so that the both longitudinal end surfaces are aligned with those of the metal mesh member 21, respectively.

In the composite body flattening step S3, the composite body 24 is molded into a flat shape. This causes the composite body 24 to be formed into a flat long rectangular shape in which the metal wires 23 of the metal mesh member 21 are closely stuck to the surface of the expanded graphite tape 22.

Figure 6:
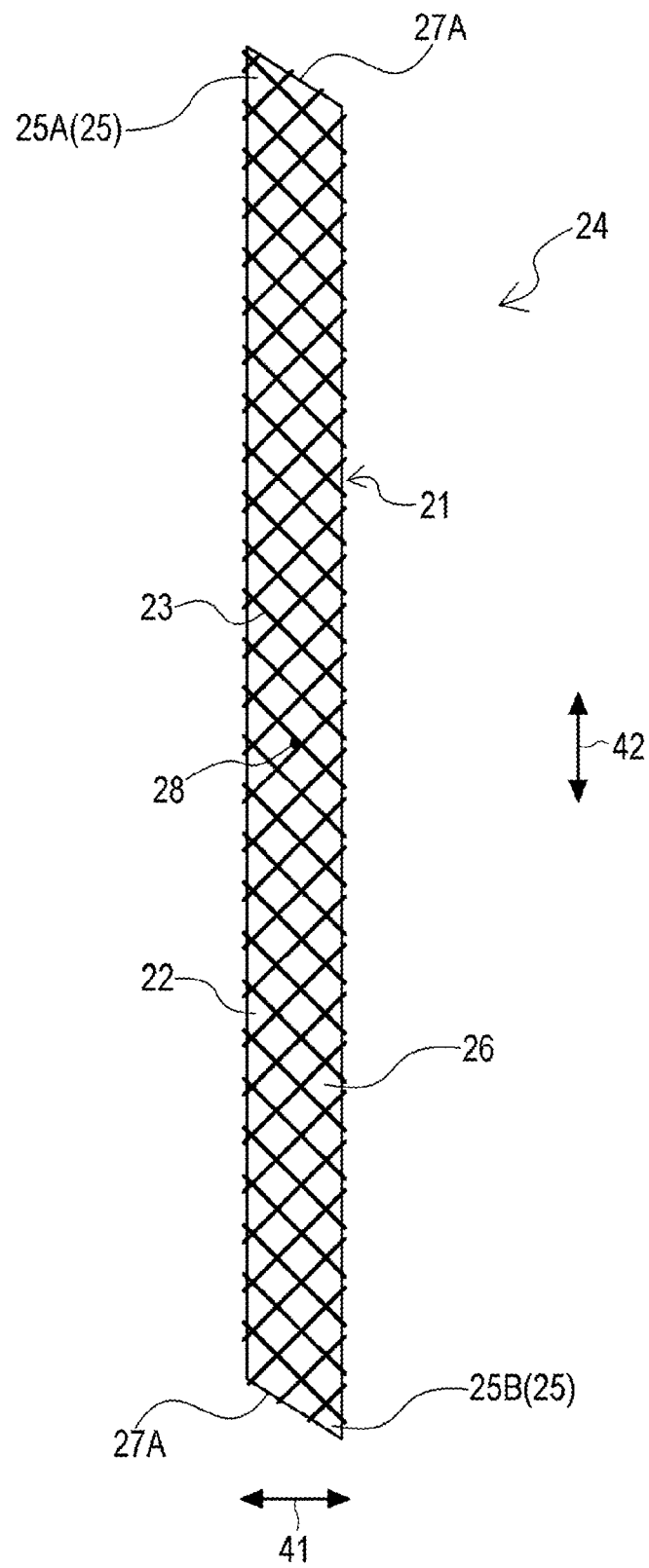
FIG. 6 is a front view of the composite body which is obtained after execution of an end-portion shape adjusting step in the method of producing a gasket of the embodiment of the invention.

In the end-portion shape adjusting step S4, with respect to the short-side direction (direction of the arrow 41) of the composite body 24, as shown in FIG. 6, the shapes of end portions 25 in the longitudinal direction (direction of the arrow 42) of the composite body 24 are adjusted so that the width dimensions of the end portions 25 of the composite body 24 are smaller than the width dimension of a longitudinal middle portion 26 of the composite body 24.

Here, the longitudinal end portions 25 of the composite body 24 are formed into an adequate shape so that the width dimensions in the short-side direction of the end surfaces and their vicinities are equal to or smaller than ¾ (preferably, ½) of the width dimension in the short-side direction of the longitudinal middle portion 26.

In the embodiment, the composite body 24 has a long rectangular shape. Therefore, each of longitudinal end portions 25A, 25B of the composite body 24 is formed into a shape which is partially notched, by cutting away one of two edge portions of the end portion 25A or 25B with a cutting plane 27A that extends linearly and obliquely with respect to the longitudinal direction.

It is assumed that the end portions 25A, 25B which have been adjusted in the end-portion shape adjusting step S4 are formed into a tapered shape in which, as proceeding from the longitudinal middle portion 26 having the predetermined width toward the respective end surfaces, the width dimension in the short-side direction of the composite body 24 is gradually reduced. The shapes of the end portions 25A, 25B are point-symmetrical with respect to the center 28 of the composite body 24.

Figure 7:
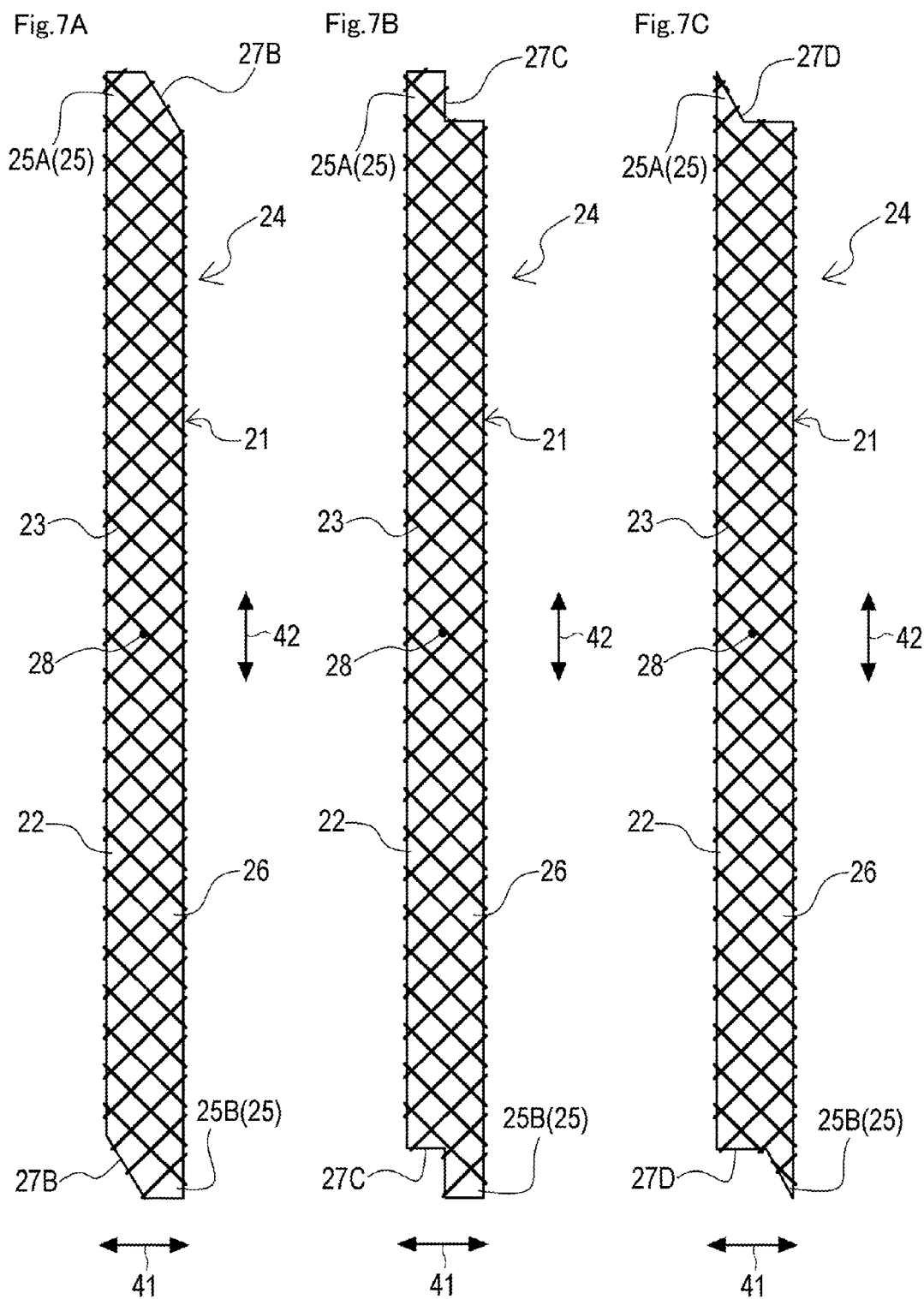
FIG. 7A is a front view of a composite body of another example which is obtained after execution of the end-portion shape adjusting step in the method of producing a gasket of the embodiment of the invention.
FIG. 7B is a front view of a composite body of a further example which is obtained after execution of the end-portion shape adjusting step in the method of producing a gasket of the embodiment of the invention.
FIG. 7C is a front view of a composite body of a still further example which is obtained after execution of the end-portion shape adjusting step in the method of producing a gasket of the embodiment of the invention.

In the end-portion shape adjusting step S4, the shapes of the end portions may be adjusted so that, as shown in FIG. 7A, the cutting planes of the end portions 25 are cutting planes 27B having an inclination angle which is smaller than the inclination angles of the cutting planes 27A in the embodiment. Alternatively, the shapes of the end portions may be adjusted so that, as shown in FIGS. 7B and 7C, the cutting planes of the end portions 25 are cutting planes 27C or 27D which are bent one time (or a plurality of times) in a middle portion.

Figure 8:
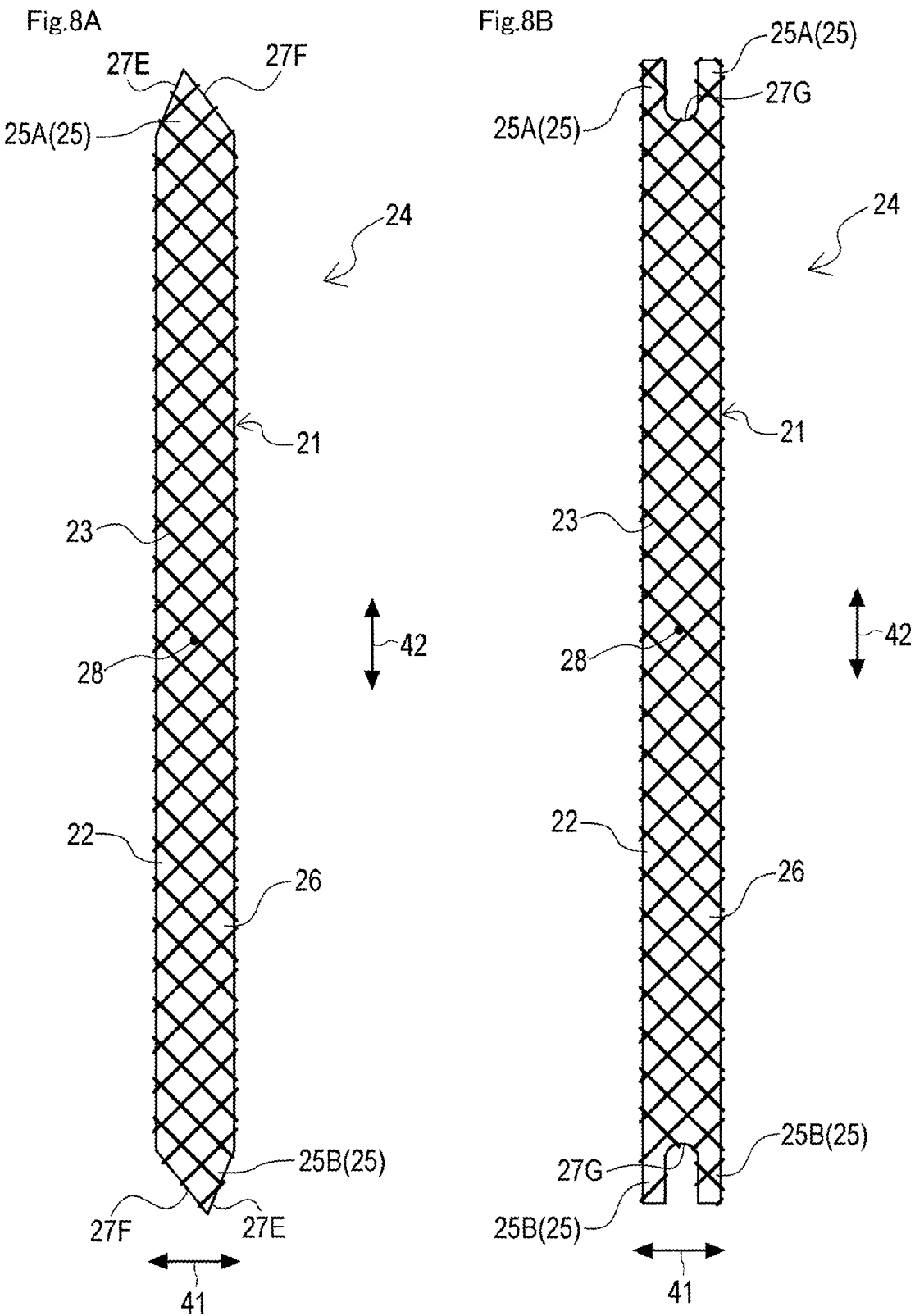
FIG. 8A is a front view of a composite body of a still further example which is obtained after execution of the end-portion shape adjusting step in the method of producing a gasket of the embodiment of the invention.
FIG. 8B is a front view of a composite body of a still further example which is obtained after execution of the end-portion shape adjusting step in the method of producing a gasket of the embodiment of the invention.

In the end-portion shape adjusting step S4, the shapes of the end portions may be adjusted so that, as shown in FIG. 8A, the cutting planes of the end portions 25 are cutting planes 27E, 27F which are located on the both sides in the short-side direction, respectively, and which have a predetermined inclination angle. Alternatively, the shapes of the end portions may be adjusted by branching the end portions so that, as shown in FIG. 8B, the cutting planes of the end portions 25 are cutting planes 27G which are recessively formed in middle portions in the short-side direction.

Figure 9:
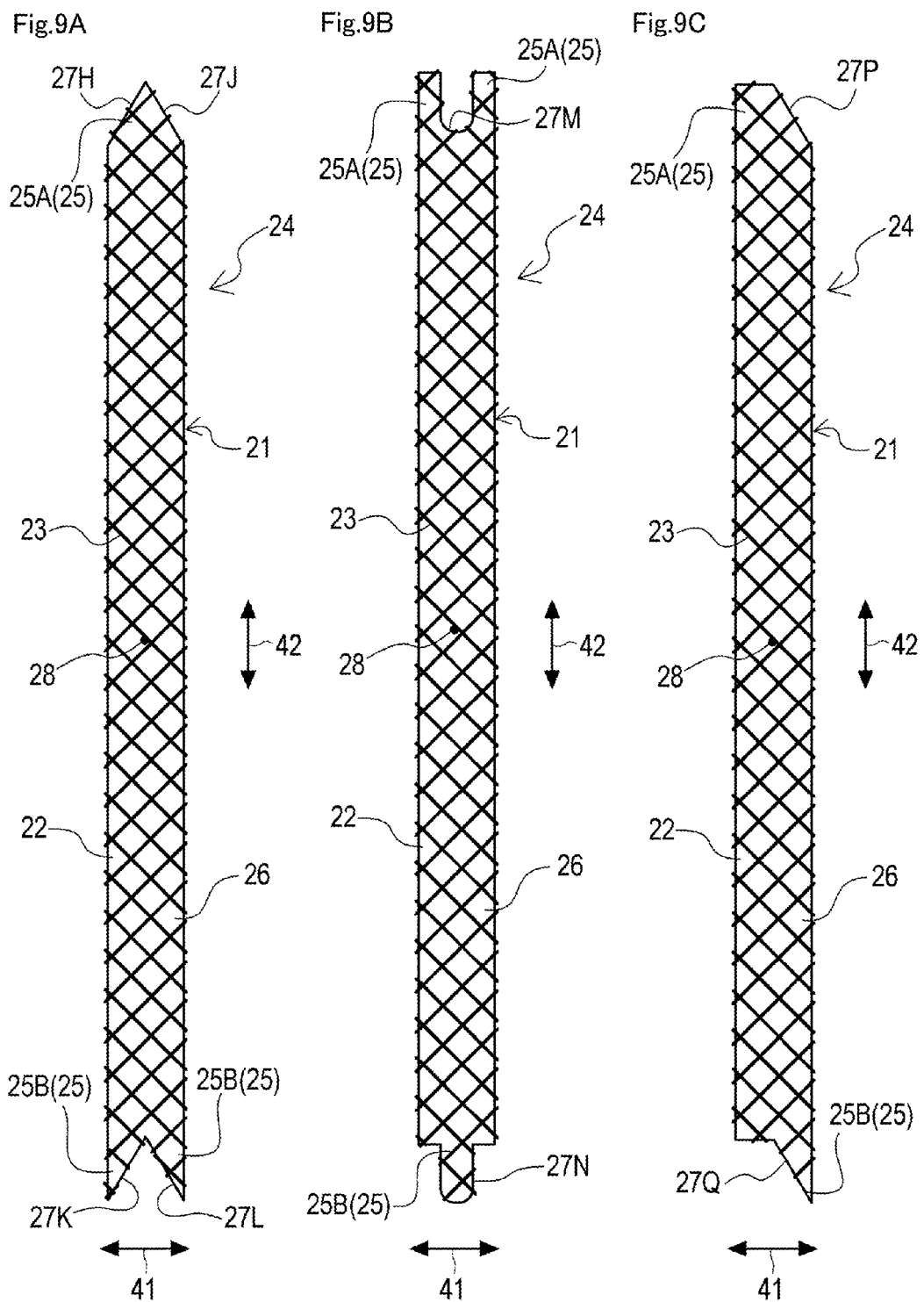
FIG. 9A is a front view of a composite body of a still further example which is obtained after execution of the end-portion shape adjusting step in the method of producing a gasket of the embodiment of the invention.
FIG. 9B is a front view of a composite body of a still further example which is obtained after execution of the end-portion shape adjusting step in the method of producing a gasket of the embodiment of the invention.
FIG. 9C is a front view of a composite body of a still further example which is obtained after execution of the end-portion shape adjusting step in the method of producing a gasket of the embodiment of the invention.

In consideration of the productivity and the yield, the one end portion 25A and the other end portion 25B may be formed into shapes (convex and concave shapes) which are mutually different but correspondent, respectively. In the end-portion shape adjusting step S4, therefore, the shapes of the end portions may be adjusted so that, as shown in FIG. 9A, the cutting planes of the end portions 25A, 25B are: cutting planes 27H, 27J and 27K, 27L, respectively; as shown in FIG. 9B, cutting planes 27M, 27N, respectively; or, as shown in FIG. 9C, cutting planes 27P, 27Q, respectively.

Figure 10:
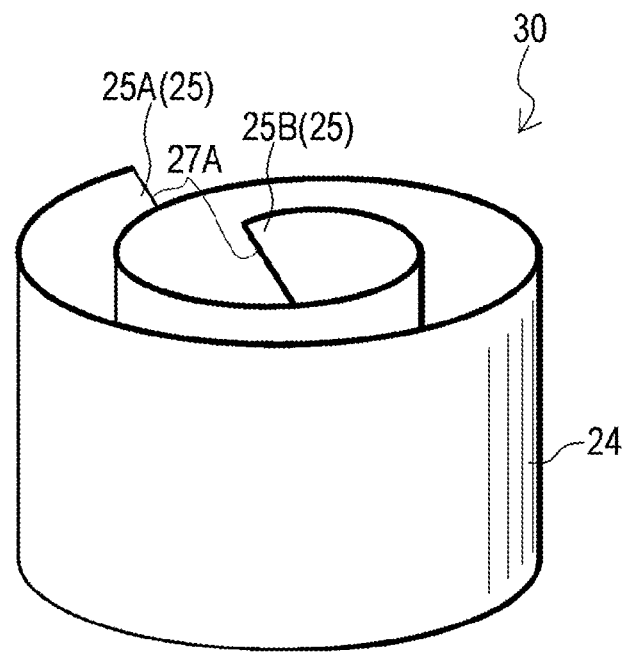
FIG. 10 is a view showing a state of a tubular body forming step in the method of producing a gasket of the embodiment of the invention.

In the tubular body forming step S5, as shown in FIG. 10, the composite body 24 is spirally wound in a state where the one end portion 25A is located on the outer circumferential side, and the other end portion 25B is located on the inner circumferential side, so as to form a spirally wound tubular body 30 in a multiply wound state in which the axial direction coincides with the short-side direction of the composite body 24. At this time, the winding number is adequately set in accordance with the thickness required in the gasket 1 to be produced.

Figure 11:
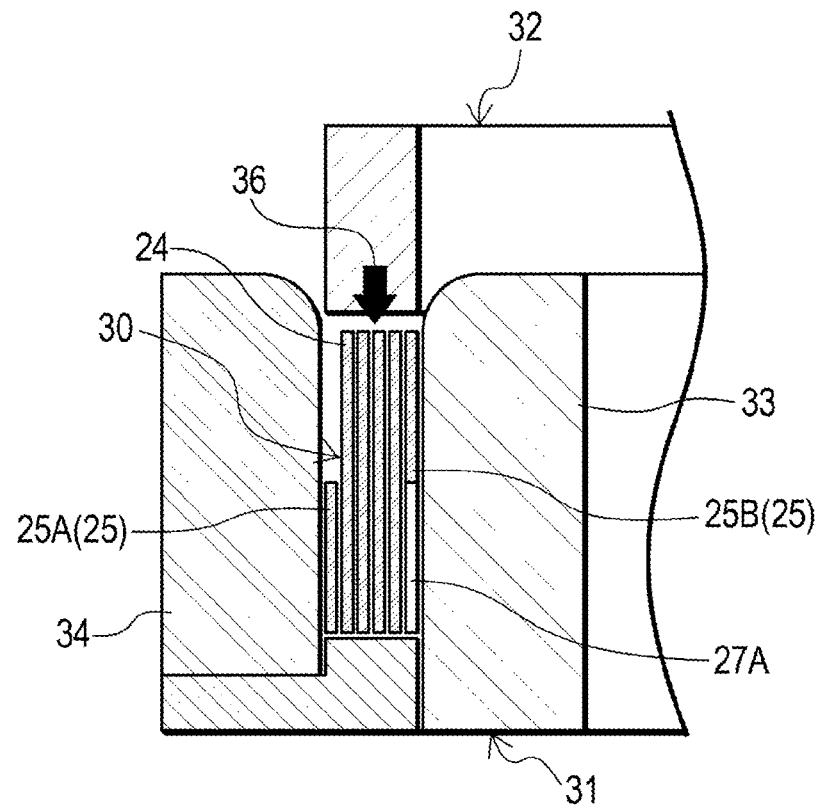
FIG. 11 is a view showing a state of a compression molding step in the method of producing a gasket of the embodiment of the invention.

In the compression molding step S6, the spirally wound tubular body 30 is compression molded in the axial direction. In the embodiment, as shown in FIG. 11, the compression molding step S6 is executed by using a stationary die 31 corresponding to the shape of the gasket 1, and a movable die 32 which is reciprocable to and from the stationary die 31.

Firstly, the spirally wound tubular body 30 is disposed between, in the stationary die 31, an inner stationary die 33 and an outer stationary die 34 while the tubular body is fitted onto the inner stationary die 33. Then, the movable die 32 is moved in the direction of the arrow 36 to be pressed in between the inner stationary die 33 and the outer stationary die 34. In this way, the spirally wound tubular body 30 is axially and radially compression molded.

In the method of producing a gasket, when the compression molding step S6 is completed, it is possible to obtain the gasket 1.

As described above, the method of producing a gasket of the embodiment includes the end-portion shape adjusting step S4. In the compression molding step S6 which is executed after the end-portion shape adjusting step S4, therefore, it is possible to cause an external force in the compression direction (direction of the arrow 36) due to the movable die 32 to be hardly applied to end portions of the spirally wound tubular body 30 (i.e., the end portions 25 of the composite body 24).

In the compression molding step S6, therefore, the end portions (particularly, the metal wires 23) of the spirally wound tubular body 30 can be prevented from being excessively deformed (protruding into gaps or the like which exist in the stationary die 31, to cause biting), and the gasket 1 can be prevented from burring. In the case where the above-described production method is used, therefore, a molding failure of the gasket 1 can be suppressed from occurring.

In the embodiment, when the tubular body forming step S5 is executed, the composite body 24 is spirally wound so that the width dimension in a radial direction of the spirally wound tubular body 30 is substantially constant over the whole circumference of the spirally wound tubular body 30. In the spirally wound tubular body 30, namely, the number of the composite bodies 24 which are juxtaposed in a radial direction is made substantially constant at any position in the circumferential direction.

According to the configuration, in the gasket 1 which is obtained after the compression molding step S6, the density and the width dimension in the axial direction can be made substantially constant over the whole circumference of the gasket. In the case where the method of producing a gasket of the embodiment is used, therefore, the molding can be stably performed.

The method of producing a gasket of the embodiment is used not only for producing the gasket 1. When the compression molding step is partially changed, for example, the method may be used also for producing the following gasket 51.

Figure 12:
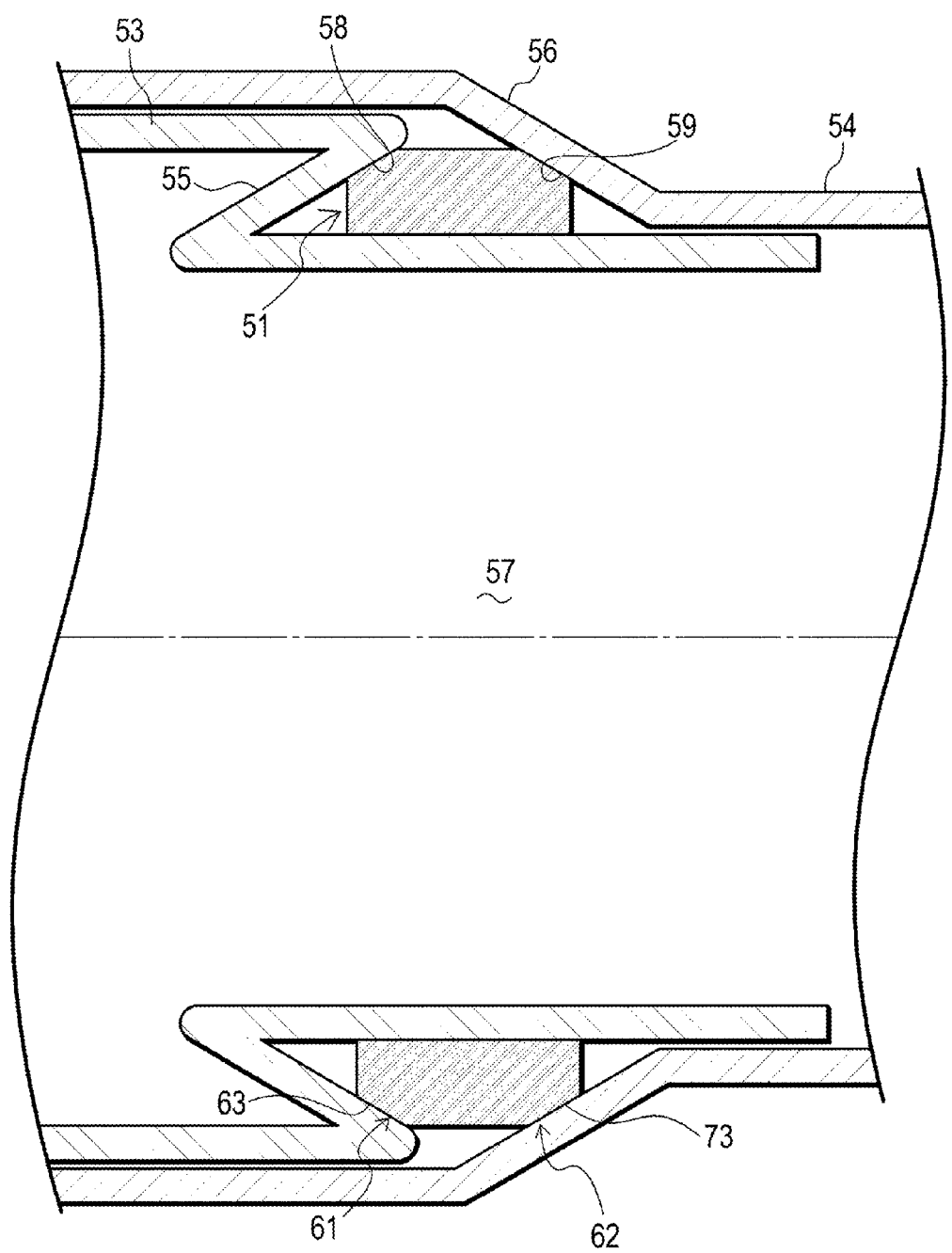
FIG. 12 is a sectional view showing a state where a gasket of a still further example produced by a method of producing a gasket of an embodiment of the invention is used.

Namely, the gasket 51 can be used in, for example, a joint for first and second pipes 53, 54 which are shown in FIG. 12. When the gasket is to be used, the gasket is attached in a state where it is fitted onto the end portion of the first pipe 53, and clamped between a first contact portion 55 which is disposed in the end portion of the first pipe, and which is annular, and a second contact portion 56 which is disposed in the end portion of the second pipe 54, and which is annular.

Figure 13:
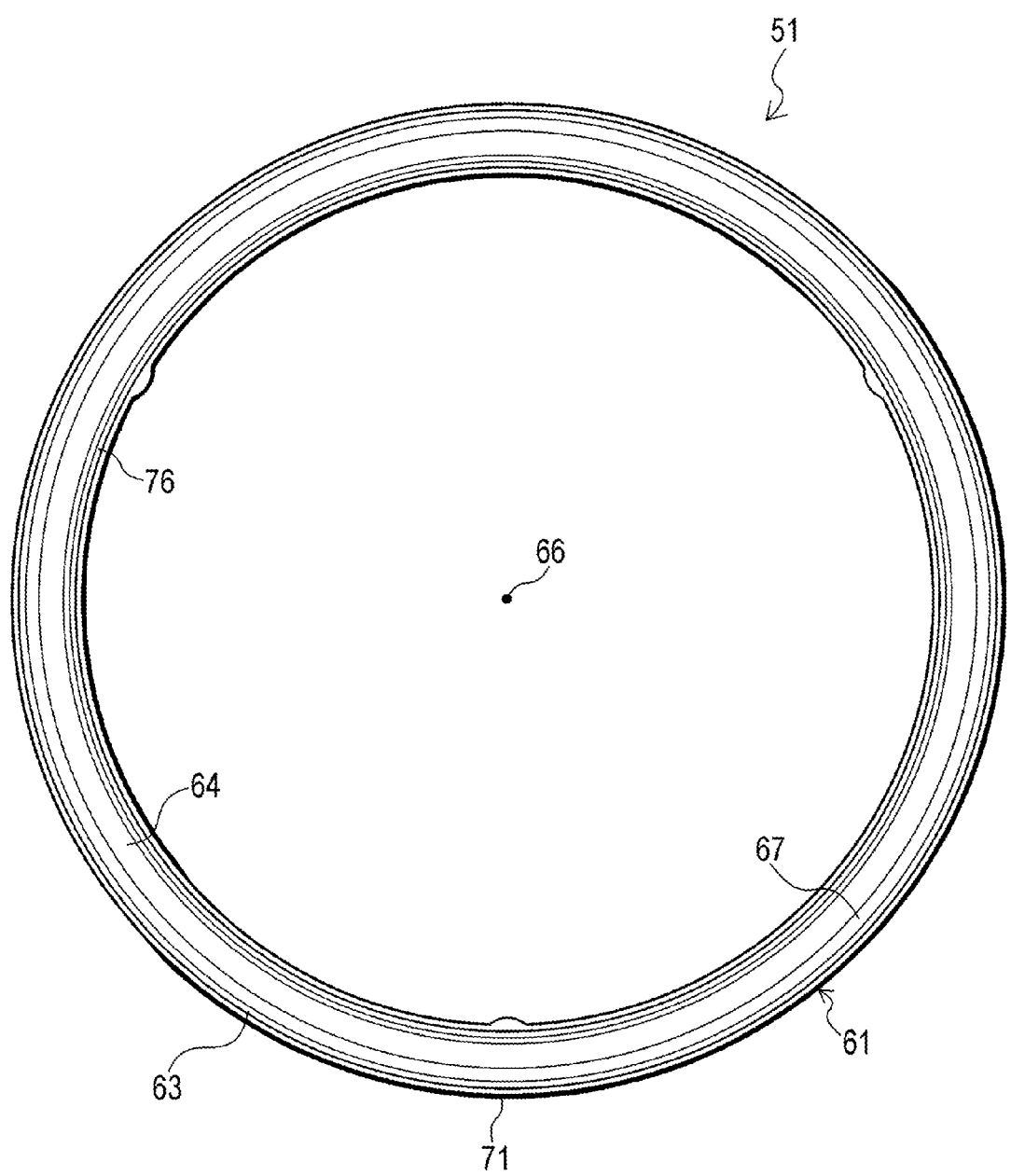
FIG. 13 is a front view of the gasket of FIG. 12.
Figure 14:
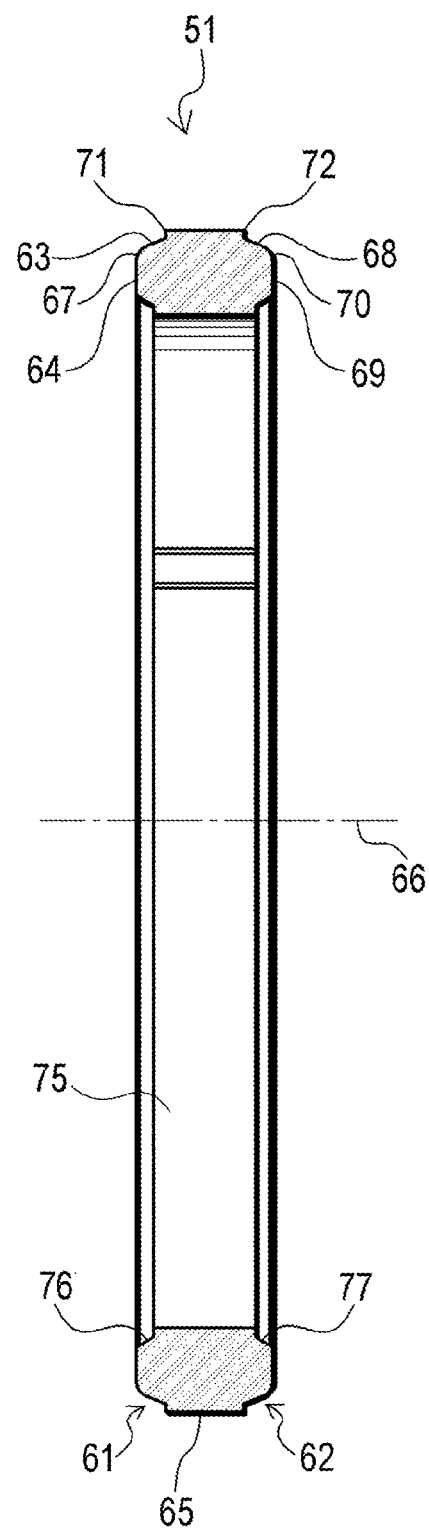
FIG. 14 is a side sectional view of the gasket of FIG. 12.

The gasket 51 includes sealing portions for preventing fluid from leaking from a flow path 57 in the first and second pipes 53, 54 which are connected to each other. In the gasket 51, as shown in FIGS. 12 to 14, a first sealing portion 61 and a second sealing portion 62 are disposed as the sealing portions.

The first sealing portion 61 is disposed in one axial end portion of the gasket 51, and placed in the radially outer side of the gasket 51. The first sealing portion 61 has a first sealing surface 63 which is tapered toward one axial end surface 64 of the gasket 51. The first sealing portion 61 is configured so that the first sealing surface 63 is contactable with the first contact portion 55 (specifically, its opposed surface 58 which is inclined).

The first sealing surface 63 is placed between the one axial end surface 64 which is opposed to the first contact portion 55, and the outer circumferential surface 65 of the gasket 51. In the gasket 51, the first sealing surface 63 is formed into a tapered shape in which the diameter is gradually reduced as proceeding from the side of the outer circumferential surface 65 (the axial center of the gasket 51) toward the one axial end surface 64.

The first sealing surface 63 is formed so that, in a section including the axis 66 of the gasket 51, a connecting portion 67 which is connected to the one axial end surface 64 that linearly radially extends exhibits an arcuate shape (rounded shape) which is convex to the radially outer side and in one axial direction of the gasket 51.

When the gasket 51 is used in the joint for the first and second pipes 53, 54 while being interposed between the first and second contact portions 55, 56 that are in proximity to each other in the axial direction, the first sealing portion 61 is pressed against the first contact portion 55 so as to be compressively deformed, and the first sealing surface 63 is press-contacted with the first contact portion 55 (opposed surface 58).

By contrast, the second sealing portion 62 is disposed in another axial end portion of the gasket 51, and placed in the radially outer side of the gasket 51. The second sealing portion 62 has a second sealing surface 68 which is tapered toward the other axial end surface 69 of the gasket 51. The second sealing portion 62 is configured so that the second sealing surface 68 is contactable with the second contact portion 56 (specifically, its opposed surface 59 which is inclined).

The second sealing surface 68 is placed between the other axial end surface 69 which is opposed to the second contact portion 56, and the outer circumferential surface 65 of the gasket 51. In the gasket 51, the second sealing surface 68 is formed into a tapered shape in which the diameter is gradually reduced as proceeding from the side of the outer circumferential surface 65 (the axial center of the gasket 51) toward the other axial end surface 69.

The second sealing surface 68 is formed so that, in a section including the axis 66 of the gasket 51, a connecting portion 70 which is connected to the other axial end surface 69 that linearly radially extends exhibits an arcuate shape (rounded shape) which is convex to the radially outer side and in the other axial direction of the gasket 51.

When the gasket 51 is used in the joint for the first and second pipes 53, 54, the second sealing portion 62 is pressed against the second contact portion 56 so as to be compressively deformed, and the second sealing surface 68 is press-contacted with the second contact portion 56 (opposed surface 59).

According to the configuration, when the gasket 51 is to be used, the gasket 51 can be clamped between the first contact portion 55 and the second contact portion 56, and the contact surface pressure in contact between the first sealing surface 63 of the first sealing portion 61 and the first contact portion 55, and that in contact between the second sealing surface 68 of the second sealing portion 62 and the second contact portion 56 can be increased.

According to the gasket 51, therefore, a high sealing property can be certainly ensured between the first contact portion 55 (end portion of the first pipe 53) and the second contact portion 56 (end portion of the second pipe 54). Since the first sealing surface 63 and the second sealing surface 68 are formed into a tapered shape, moreover, the manner of applying an external force to the end portions of the spirally wound tubular body in the compression molding step can be changed, and it is possible to effectively prevent burrs from being formed on the obtained gasket 51.

In the gasket 51, as shown in FIGS. 13 and 14, the first sealing portion 61 further has a first projecting portion 71 which projects to the outside of the gasket 51, with respect to the first sealing surface 63. The first sealing portion 61 is configured so as to exert a sealing function while using the first sealing surface 63 and the first projecting portion 71.

Specifically, the first projecting portion 71 is placed between the first sealing surface 63 and the outer circumferential surface 65 of the gasket 51. The first projecting portion 71 is formed into a pointed shape so as to project from the first sealing surface 63 toward a radially outer side, and from the outer circumferential surface 65 in one axial direction.

When the gasket 51 is to be used, the first sealing portion 61 presses, in advance of the first sealing surface 63, the first projecting portion 71 from the pointed end side against the first contact portion 55 (opposed surface 58), and, while collapsing the first projecting portion 71, the first sealing surface 63 and the first projecting portion 71 are press-contacted with the first contact portion 55.

According to the configuration, in order to exert a sealing function, at the same time when the first sealing surface 63 of the first sealing portion 61 is contacted with the first contact portion 55 (opposed surface 58), the first projecting portion 71 which is deformed so as to collapse can be made contact with the first contact portion, and the first sealing portion 61 can be contacted with the first contact portion 55 at a higher contact surface pressure. Therefore, the sealing property of the first sealing portion 61 can be enhanced.

In the gasket 51, as shown in FIG. 14, the second sealing portion 62 further has a second projecting portion 72 which projects to the outside of the gasket 51, with respect to the second sealing surface 68. The second sealing portion 62 is configured so as to exert a sealing function while using the second sealing surface 68 and the second projecting portion 72.

Specifically, the second projecting portion 72 is placed between the second sealing surface 68 and the outer circumferential surface 65 of the gasket 51. The second projecting portion 72 is formed into a pointed shape so as to project from the second sealing surface 68 toward a radially outer side, and from the outer circumferential surface 65 in the other axial direction.

When the gasket 51 is to be used, the second sealing portion 62 presses, in advance of the second sealing surface 68, the second projecting portion 72 from the pointed end side against the second contact portion 56 (opposed surface 59), and, while collapsing the second projecting portion 72, the second sealing surface 68 and the second projecting portion 72 are press-contacted with the second contact portion 56.

According to the configuration, in order to exert a sealing function, at the same time when the second sealing surface 68 of the second sealing portion 62 is contacted with the second contact portion 56 (opposed surface 59), the second projecting portion 72 which is deformed so as to collapse can be made contact with the second contact portion, and the second sealing portion 62 can be contacted with the second contact portion 56 at a higher contact surface pressure. Therefore, the sealing property of the second sealing portion 62 can be enhanced.

In the gasket 51, as shown in FIGS. 13 and 14, a first chamfered portion 76 is formed between the one axial end surface 64 of the gasket 51 and the inner circumferential surface 75 of the gasket 51. The first chamfered portion 76 has an inclined surface in which the diameter is gradually increased as proceeding from the inner circumferential surface 75 toward the one axial end surface 64, and is disposed over the whole circumference of the gasket 51.

In the gasket 51, as shown in FIG. 14, a second chamfered portion 77 is formed between the other axial end surface 69 of the gasket 51 and the inner circumferential surface 75 of the gasket 51. The second chamfered portion 77 has an inclined surface in which the diameter is gradually increased as proceeding from the inner circumferential surface 75 toward the other axial end surface 69, and is disposed over the whole circumference of the gasket 51.

In the gasket 51, as shown in FIG. 14, the first sealing portion 61 and the second sealing portion 62 have a shape which is symmetrical in the axial direction across the axial central portion (outer circumferential surface 65) of the gasket 51.

According to the configuration, when the gasket 51 is attached to an end portion of the first pipe 53, a high sealing property is easily exerted irrespective of the direction of the gasket 51. In attachment to the first and second pipes 53, 54, therefore, it is not necessary to consider the direction of the gasket 51, and hence the workability can be improved.

Figure 15:
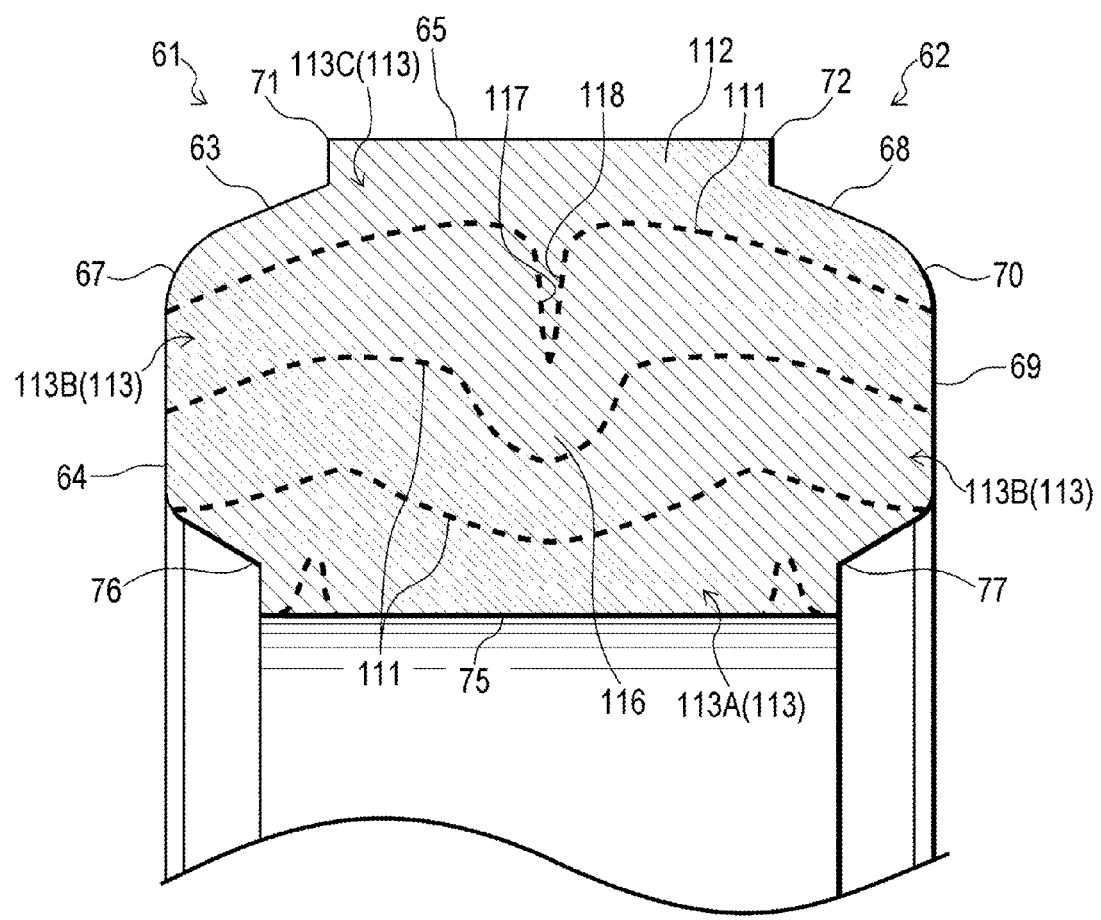
FIG. 15 is a partial enlarged view of FIG. 14.

In the gasket 51, as exaggeratedly shown in FIG. 15, a composite body 113 exists in a multiply wound state in which multiple layers radially overlap with one another, and metal wires configuring a metal mesh member 111, and expanded graphite 112 mixedly exist.

The gasket 51 has a sectional shape in which the composite body 113 that is caused to have a bent state by the above-described compression molding step overlaps in a radial direction of the gasket 51. In the gasket 51, the composite body 113 includes a first bent portion 116 which is radially bent in an acute angle shape.

Specifically, the composite body 113 has an inner-circumference composite body portion 113A, a plurality of intermediate composite body portions 113B, and an outer-circumference composite body portion 113C. The inner-circumference composite body portion 113A, the plurality of intermediate composite body portions 113B, and the outer-circumference composite body portion 113C are stacked together in this sequence in the direction from the radially inner circumferential side of the gasket 51 toward the outer circumferential side.

The plurality of intermediate composite body portions 113B are bent at a degree of bending which is different from the degrees of bending of the adjacent composite body portions, and include a bent portion that projects toward the radially inner side, in an axial middle portion. At least one of the intermediate composite body portions 113B is bent into a V-like sectional shape in the axial middle portion so that the bent portion is formed as the first bent portion 116.

The first bent portion 116 has inclined surfaces 117, 118 which are opposed to each other. The first bent portion 116 is formed in a manner that the angle formed by the inclined surfaces 117, 118 is an acute angle so that the inclined surfaces 117, 118 are in proximity to each other with a predetermined gap (or contacted with each other) in a section including the axis 66 of the gasket 51.

In the embodiment, the first bent portion 116 is formed into a shape which is symmetrical in the axial direction of the gasket 51. The first bent portion 116 is placed in an axially central portion of the gasket 51 so that the first bent portion is located at a position which is equidistant from the first and second sealing portions 61, 62.

According to the configuration, when the gasket 51 is attached to an end portion of the first pipe 53 so as to be clamped between the first and second contact portions 55, 56, the contact surface pressure in contact between the first sealing surface 63 of the first sealing portion 61 and the opposed surface 58, and that in contact between the second sealing surface 68 of the second sealing portion 62 and the opposed surface 59 can be increased by using the repulsive force caused by bending of the composite body 113, particularly the composite body portions 113B including the first bent portion 116. Therefore, a high sealing property can be ensured in the first sealing portion 61 and the second sealing portion 62.

In the gasket 51, moreover, the portion in the composite body 113 (in the embodiment, the outer-circumference composite body portion 113C) which is adjacent to the first bent portion 116 can be clamped by the first bent portion 116. Therefore, the overlapping portions of the composite body 113 are caused to be hardly dissociated, and a shape failure of the gasket 51 can be suppressed from occurring. As a result, the shape of the gasket 51 can be stabilized.

DESCRIPTION OF REFERENCE NUMERALS 1 gasket
21 metal mesh member
22 expanded graphite tape
24 composite body
25 (25A, 25B) longitudinal end portion of composite body
26 longitudinal middle portion of composite body
30 spirally wound tubular body
51 gasket
61 first sealing portion
63 first sealing surface
62 second sealing portion
68 second sealing surface
113 composite body
116 first bent portion
S1 material preparing step
S2 composite body forming step
S3 composite body flattening step
S4 end-portion shape adjusting step
S5 tubular body forming step
S6 compression molding step

The invention claimed is:

1. A method of producing a gasket configured by using a metal mesh member and expanded graphite, comprising the steps of:

preparing the metal mesh member and the expanded graphite;

placing the metal mesh member around the expanded graphite in a manner that a long belt-like composite body in which the expanded graphite is enveloped by the metal mesh member is formed;

adjusting shapes of longitudinal end portions of the composite body by partially notching each of the longitudinal end portions of the composite body such that, in a short-side direction of the composite body, width dimensions of the longitudinal end portions of the composite body are smaller than a width dimension of a longitudinal middle portion of the composite body;

subsequent to the step of adjusting the shapes of the longitudinal end portions of the composite body, spirally winding the composite body in a manner that a tubular body in a multiply wound state in which an axial direction coincides with the short-side direction of the composite body is formed; and compress molding the tubular body in an axial direction of the tubular body.

2. The method of producing a gasket according to claim 1, wherein the composite body is spirally wound in a manner that the width dimension in a radial direction of the tubular body is substantially constant over a whole circumference of the tubular body.

* * * * *